No Printed Specification Available
9248X
Y. Wilkinson,
Truss.
Patented Nov. 14, 1835.
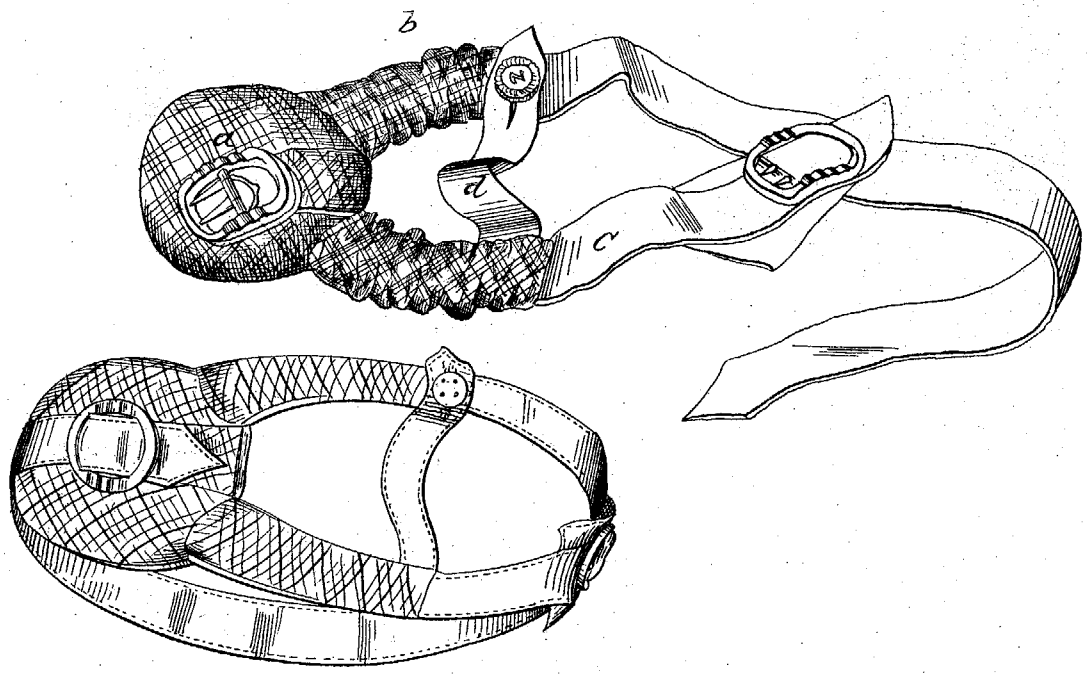
AM. PHOTO-LITHO. CO. N.Y. (OSBORNE'S PROCESS.)

Nov 14. 1835

Vernume Wilkinson

Letters Patent

The schedule referred to in these Letters Patent and making part of the same containing a description in the words of the said Vernume Wilkinson himself of his improvement in the Gum Elastic Truss for Hernia Specification of the Gum Elastic Truss for the Inguinal Hernia This Truss is composed of Gum Elastic without any Metallic substance being connected with it. It is formed of a piece of Gum Elastic about two inches in breadth at one end and about two inches and an half inch in breadth at the other end running in a triangular form being varied in size in proportion to the size of the subject to which it is to be applied. Convex on the inside and some of them with two convex wings with a concave groove between them and some of them flat on the inside. From this rupture pad proceeds a cord of the same substance which passes down around the thigh and is attached to the upper and outer angle of the rupture pad. So that this cord holds the lower edge as well as the lower angle of the pad close down as well as makes pressure against the lower part of the abdomen below and over the abdominal ring through which the protrusion comes. From the upper and outer angle of the pad a little above the place where the cord that passes around the thigh is fastened commences a band about one inch and an half inch in breadth of the same substance. or this band must be varied in size as upon the elasticity of this band depends the pressure applied to the upper portion of the pad therefore in some instances this band may have to be strengthened by being made larger and in some cases a web of cloth may be used instead of the Gum Elastic band where it requires greater strength to keep up the hernia than in ordinary cases. this band passes around the Body and the end is fastened to the rupture pad by a Gum Elastic Button and button holes in the band so as to button the band in front upon the pad or

[illegible]

the band may be attached permanently to the pad so as to make it
entirely whole. a smaller sized band is attached to the cord that passes
around the thigh and passes back from 3 to eight inches in an
angle and is fastened to the band that goes around the body so as
to make extension upon this cord keeping it close to the inside
of the thigh and groin. At the junction of the Pad and band that
goes around the body commences a second cord and passes down
ward is attached to the cord that goes around the thigh below where
the small band is fastened to the first cord – For a double truss
the pad is made large enough to extend across the lower portion of the
abdomen so as to cover over and extend out on either side beyond
the abdominal ring. made like unto two single trusses united by reverting
them from right and left being whole in the centre and being sup-
ported and kept to its place by the gum elastic bands and cords in
like manner as the single Truss is already described. this double
truss may also be applied to females to support and give strength
to the lower portion of the abdomen in case of the falling of the uterus
with the following variations to wit. The pad is ~~to be~~ made so wide &
extended so high as to fill the hypogastric region of the abdomen and
applied and retained in its place by the bands and cords as first described
For Umbilical Hernia – The pad is of an oval shape its length
to be applied up and down, a flat band to be attached to one side of
the rupture pad and to pass around the body and to button on the op-
posite side of the pad by means of buttons and button holes. or may be
permanently attached – these trusses are all to be covered with cloth
except under the rupture pad. this may be covered or not.

The applicant claims to have invented and used on his own per
son. a Truss made by himself of the substance and of one of the forms
above described sometime before he heard of the construction of any part
of a truss made of the same substance by any other person On or about
the first day of August last he was informed that doctor Heintzel
man had a patent for a truss upon the old plan of spring and
pads. and that the rupture pad was coomed with or in some
way

9248X

447.

made of Gum Elastic with a spiral spring in the centre but the applicant has never seen it — The applicants invention differs from all other trusses so far as known to him in being constructed of gum elastic and being kept in its place by means of the bands and cords without the use of any metallic or wooden substance — the pad being also of a different and new shape as above described Witnesses — New York 14th September 1835

D W Cowdry — Vernum Wilkinson

Ransom Warren 966 w.s.

E. L.
C.G.W.

(Drawing)
(Patented November 14, 1835)